United States Patent
Kato et al.

(10) Patent No.: US 11,056,886 B2
(45) Date of Patent: Jul. 6, 2021

(54) POWER STORAGE SYSTEM

(71) Applicant: Panasonic Intellectual Property Management Co., Ltd., Osaka (JP)

(72) Inventors: Masaki Kato, Osaka (JP); Naohisa Morimoto, Osaka (JP); Masaaki Kuranuki, Kyoto (JP); Jun Yamasaki, Hyogo (JP); Yohei Ishii, Osaka (JP); Koichi Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/615,523

(22) PCT Filed: Apr. 16, 2018

(86) PCT No.: PCT/JP2018/015665
§ 371 (c)(1),
(2) Date: Nov. 21, 2019

(87) PCT Pub. No.: WO2018/221040
PCT Pub. Date: Dec. 6, 2018

(65) Prior Publication Data
US 2020/0127458 A1    Apr. 23, 2020

(30) Foreign Application Priority Data
Jun. 2, 2017 (JP) .............................. JP2017-110404

(51) Int. Cl.
*H02J 3/32* (2006.01)
*H02J 7/00* (2006.01)
(Continued)

(52) U.S. Cl.
CPC .............. *H02J 3/32* (2013.01); *H02J 7/0013* (2013.01); *H02J 7/02* (2013.01); *H02J 7/34* (2013.01);
(Continued)

(58) Field of Classification Search
CPC ............. H01M 10/425; H01M 10/482; H01M 2010/4271; H02J 3/38; H02J 7/34;
(Continued)

(56) References Cited

U.S. PATENT DOCUMENTS

2008/0203820 A1*  8/2008  Kramer .................... H02J 3/40
                                                                    307/64
2015/0349387 A1* 12/2015  Inaba ..................... G05B 15/02
                                                                   700/297
(Continued)

FOREIGN PATENT DOCUMENTS

| JP | 2005-051967 | 2/2005 |
| JP | 2015-162917 | 9/2015 |
| JP | 2016-042782 | 3/2016 |

OTHER PUBLICATIONS

International Search Report of PCT application No. PCT/JP2018/015665 dated Jun. 19, 2018.

*Primary Examiner* — Jared Fureman
*Assistant Examiner* — Duc M Pham
(74) *Attorney, Agent, or Firm* — McDermott Will & Emery LLP (57) ABSTRACT

In a power storage system, a three-phase AC wire is connected to a three-phase AC power system. Power storage blocks, each of which includes a power storage module and a power conditioner, are connected in parallel to the three-phase AC wire. A system controller individually controls power storage blocks. The power storage modules each includes: a power storage unit; and a management unit that manages the power storage unit. The power conditioner (Continued)

includes a power converter and a controller. The power converter converts DC power discharged into single-phase AC power and outputs the converted AC power to two lines of the three-phase AC wire, or converts single-phase AC power received from the two lines of the three-phase AC wire into DC power and charges the power storage unit. The controller is connected to the system controller via a communication line and the management unit via a communication line.

11 Claims, 7 Drawing Sheets

(51) Int. Cl.
*H02J 7/02* (2016.01)
*H02J 7/34* (2006.01)
*H02M 1/12* (2006.01)
*H02M 7/5387* (2007.01)
*H01M 10/42* (2006.01)
*H01M 10/48* (2006.01)

(52) U.S. Cl.
CPC ....... *H02M 1/126* (2013.01); *H02M 7/53871* (2013.01); *H01M 10/4257* (2013.01); *H01M 10/482* (2013.01); *H01M 2010/4271* (2013.01)

(58) Field of Classification Search
CPC . H02J 7/0013; Y02E 60/10; H02M 2001/008; H02M 1/126; H02M 7/53871
See application file for complete search history.

(56) References Cited

U.S. PATENT DOCUMENTS

2016/0048194 A1    2/2016   Lee et al.
2016/0352111 A1*   12/2016   Arita ................ H01M 10/4207

* cited by examiner

POWER STORAGE SYSTEM

CROSS-REFERENCE TO RELATED APPLICATIONS

This application is a U.S. national stage application of the PCT International Application No. PCT/JP2018/015665 filed on Apr. 16, 2018, which claims the benefit of foreign priority of Japanese patent application 2017-110404 filed on Jun. 2, 2017, the contents all of which are incorporated herein by reference.

The present invention relates to a power storage system in which a plurality of power storage blocks are interconnected in parallel.

BACKGROUND ART

There has been a method of constructing a three-phase alternating current (AC) power storage system in which a plurality of single-phase power storage blocks are connected to respective lines of a three-phase AC wire. Each of these single-phase power storage blocks has a pair of power storage module and power conditioner (for example, see PTL 1).

CITATION LIST

Patent Literature

PTL 1: Unexamined Japanese Patent Publication No. 2016-42782

SUMMARY OF THE INVENTION

Technical Problem

If an abnormality or breakage occurs in one of the single-phase power storage blocks within the power storage system configured above, the entire system may have difficulty continue to operate. If an abnormality or breakage is detected from one of the single-phase power storage blocks, it is necessary to halt the operation of the entire system in order to repair or replace this single-phase power storage block.

An object of the present invention, which has been made in the consideration of the above situation, is to provide a highly robust, scalable power storage system.

A power storage system according to an aspect of the present invention which addresses the above problem includes: a three-phase alternating current (AC) wire connected to a three-phase AC power system; a plurality of power storage blocks connected in parallel to the three-phase AC wire, each of the power storage blocks including a power storage module and a power conditioner; and a system controller that individually controls the plurality of power storage blocks. The power storage modules each include: a power storage unit; and a management unit that manages the power storage unit. The power conditioner includes: a power converter that converts direct current (DC) power discharged from the power storage unit into single-phase AC power and outputs the converted AC power to two lines of the three-phase AC wire or that converts single-phase AC power received from the two lines of the three-phase AC wire into DC power and charges the power storage unit; and a controller that controls the power converter, the controller being connected to the system controller via a first communication line, the controller being connected to the management unit via a second communication line. The plurality of power storage blocks are six or more power storage blocks. Out of the six or more power storage blocks, two or more power storage blocks are U-phase power storage blocks, two or more power storage blocks are V-phase power storage blocks, and two or more power storage blocks are W-phase power storage blocks.

According to the present invention, it is possible to achieve a highly robust, scalable power storage system.

DESCRIPTION OF EMBODIMENT

Figure 1:
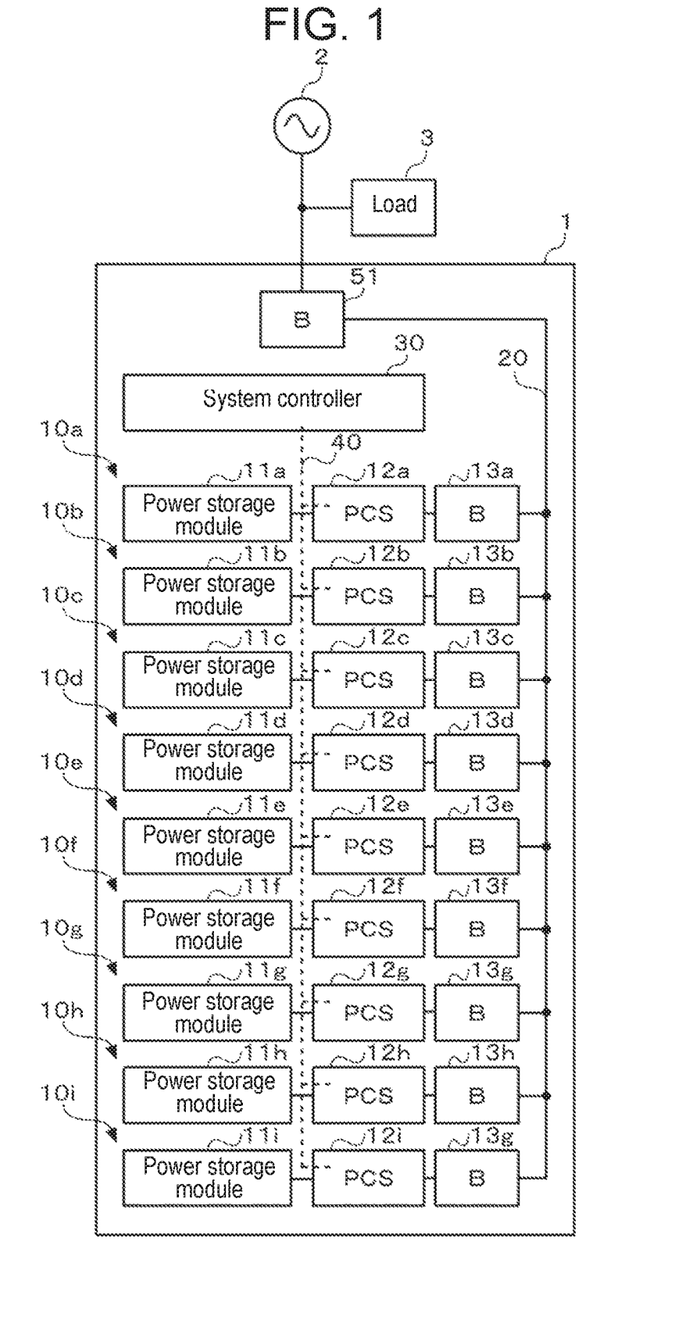
FIG. 1 is a schematic view of an outer configuration of a power storage system according to an exemplary embodiment of the present invention.

FIG. 1 is a schematic view of an outer configuration of power storage system 1 according to an exemplary embodiment of the present invention. Disposed and stacked in a cabinet of power storage system 1 are a plurality of power storage blocks 10a to 10i. One power storage block 10 includes power storage module 11, power conditioner 12, and breaker 13. Power storage module 11 is a low-capacity power storage module, and power conditioner 12 is a compact single-phase power conditioner. Each of the plurality of power storage blocks 10a to 10i is connected to two lines of three-phase alternating current (AC) wire 20.

Three-phase AC wire 20, which may be a bus bar, for example, is disposed vertically inside the cabinet. Three-phase AC wire 20 may be formed of either a star connection having a three-phase four-wire system or a delta connection having a three-phase three-wire system. The connection of power storage system 1 may be determined as appropriate in accordance with a commercial power system (referred to below as a power system) available in a region where power storage system 1 is to be installed. Three-phase AC wire 20 is drawn from a top surface of the cabinet of power storage system 1 via master breaker 51 and connected to power system 2. Three-phase AC wire 20 between power storage system 1 and power system 2 is connected to load 3.

Of the plurality of power storage blocks 10a to 10i stacked, three power storage blocks 10 constitute a three-phase AC output power storage system. Those three power storage blocks 10 output single-phase AC voltages with phases shifted by 120°. In the example illustrated in FIG. 1, three three-phase AC output power storage systems are constituted. However, a number of power storage blocks 10 installed in the cabinet does not necessarily have to be a multiple of three. One or two redundant power storage blocks 10 may be connected to three-phase AC wire 20 in advance. This redundant power storage blocks 10 may be kept halted during a normal operation.

Disposed above the plurality of power storage blocks 10a to 10i stacked in the cabinet is system controller 30. System controller 30 is connected to the plurality of power conditioners 12a to 12i via communication line 40. Master breaker 51 is disposed above system controller 30. Optionally, in order to construct a large-scale system, communication and power relays may be provided, and a plurality of power storage systems 1 may be interconnected in parallel.

Figure 2:
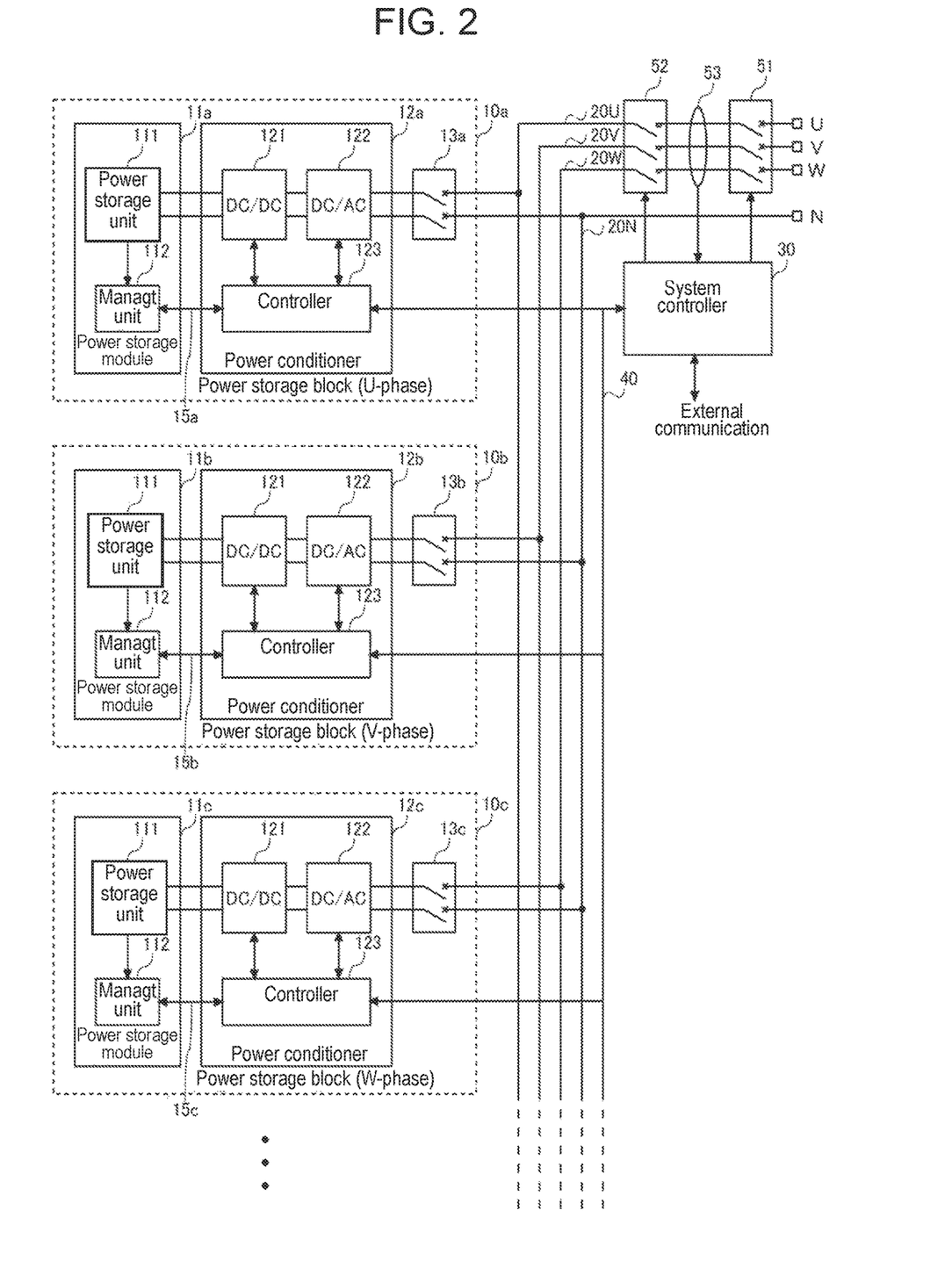
FIG. 2 is a view of a circuit configuration example 1 of the power storage system according to the exemplary embodiment of the present invention.

FIG. 2 is a view of a circuit configuration example 1 of power storage system 1 according to the exemplary embodiment of the present invention. The circuit configuration example 1 illustrated in FIG. 2 is an example of a star connection having a three-phase four-wire system. Three-phase AC wire 20 includes four wires: U-phase wire 20U, V-phase wire 20V, W-phase wire 20W, and N-phase wire 20N.

Figure 3:
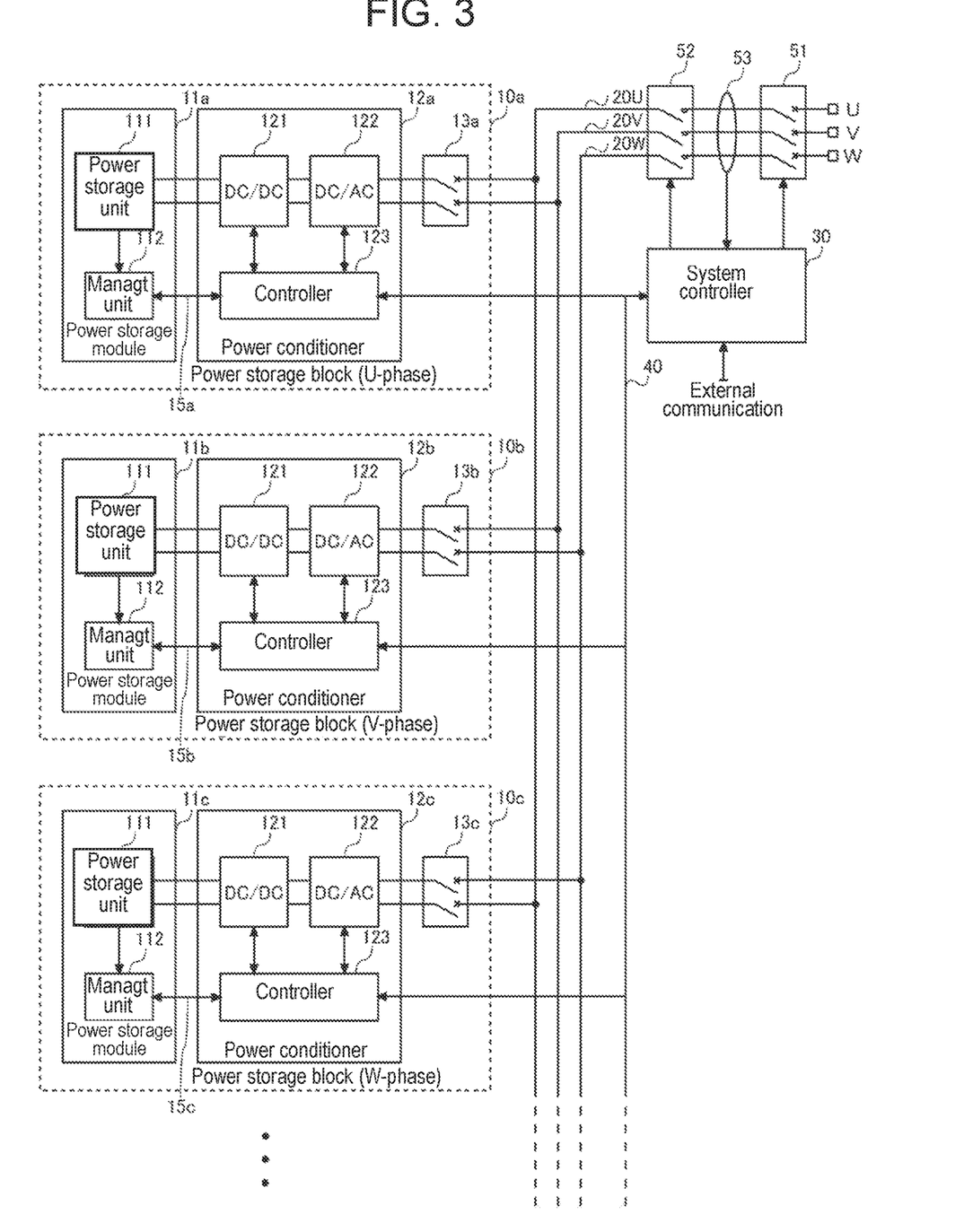
FIG. 3 is a view of a circuit configuration example 2 of the power storage system according to the exemplary embodiment of the present invention.

FIG. 3 is a view of a circuit configuration example 2 of power storage system 1 according to the exemplary embodiment of the present invention. The circuit configuration example 2 illustrated in FIG. 3 is an example of a delta connection having a three-phase three-wire system. Three-phase AC wire 20 includes three wires: U-phase wire 20U, V-phase wire 20V, and W-phase wire 20W. Circuit configuration example 2 illustrated in FIG. 3 is identical to the circuit configuration example 1 illustrated in FIG. 2, aside from three-phase AC wire 20.

Power storage module 11a includes power storage unit 111 and management unit 112. Power conditioner 12a includes DC/DC converter 121, DC/AC converter 122, and controller 123. Power storage unit 111 includes a plurality of cells interconnected in series or in series and parallel. Each of the cells may be a lithium ion battery cell, a nickel hydride battery cell, an electric double layer capacitor cell, or a lithium ion capacitor cell, for example. Hereinafter, an example in which lithium ion battery cells are used will be considered.

Management unit 112 detects a voltage, current, and temperature of the plurality of cells in power storage unit 111. Based on the detected voltage, current, and temperature of the cells, management unit 112 estimates a state of charge (SOC) and a state of health (SOH) of the cells. When estimating the SOC, management unit 112 may use a current integration method or an open circuit voltage (OCV) method. The SOH is specified by a ratio of present full charge capacity to initial full charge capacity. This value decreases as the degradation increases. If management unit 112 does not have a current measurement function, controller 123 in power conditioner 12a may measure a current flowing through the plurality of cells in power storage unit 111. Then, controller 123 may receive information on a voltage and temperature measured by power storage module 11a through communication, and estimate the SOC and SOH.

Management unit 112 designates the detected or estimated voltage, current, temperature, SOC, and SOH of the cells as management data, and then transmits this management data to controller 123 via communication line 15a. The communication between management unit 112 and controller 123 may be, for example, serial communication conforming to RS-485 specifications. Management unit 112 may be connected to controller 123 through wireless communication or communication over a power line.

Both DC/DC converter 121 and DC/AC converter 122 in power conditioner 12a constitute a power converter. This power converter converts direct current (DC) power discharged from power storage unit 111 into single-phase AC power, and then outputs this single-phase AC power to two lines of three-phase AC wire 20. Also, the power converter converts the single-phase AC power received from the two lines of three-phase AC wire 20 into DC power, and then charges power storage unit 111.

DC/DC converter 121 can control a current or voltage of the DC power discharged by power storage unit 111 or used to charge power storage unit 111. For example, DC/DC converter 121 enables constant current (CC)/constant voltage (CV) discharging or CC/CV charging. DC/DC converter 121 may be a step-up/down chopper, for example. Optionally, an unillustrated isolation transformer may be interposed between DC/DC converter 121 and DC/AC converter 122.

Two terminals of power conditioner 12a on an AC side are connected to two lines of three-phase AC wire 20 via breaker 13. If a star connection having a three-phase four-wire system is constructed, power storage block 10 allocated to a U phase is connected between U-phase wire 20U and N-phase wire 20N; power storage block 10 allocated to a V phase is connected between V-phase wire 20V and N-phase wire 20N; and power storage block 10 allocated to a W phase is connected between W-phase wire 20W and N-phase wire 20N. If a delta connection having a three-phase three-wire system is constructed, power storage block 10 allocated to a U phase is connected between U-phase wire 20U and V-phase wire 20V; power storage block 10 allocated to a V phase is connected between V-phase wire 20V and W-phase wire 20W; and power storage block 10 allocated to a W phase is connected between W-phase wire 20W and U-phase wire 20U.

Breaker 13 is a breaker that electrically isolates both power storage module 11 and power conditioner 12 from three-phase AC wire 20. Typically, breaker 13 may be a manual switch. An operator switches off breaker 13 when maintaining, repairing, or replacing one or both of power storage module 11 and power conditioner 12. In this way, it is possible to maintain, repair, or replace (perform hot-swap of) some power storage modules 11 and/or power conditioners 12 without halting an operation of power storage system 1.

Three-phase AC wire 20 is exposed to outside of power storage system 1 via electromagnetic relay 52, current and voltage sensor 53, and master breaker 51. Electromagnetic relay 52 is controlled by system controller 30. Current and voltage sensor 53 detects currents flowing through respective phases of three-phase AC wire 20 and outputs the detected current values to system controller 30. Current and voltage sensor 53 may be a current transformer sensor, for example. Master breaker 51, which may be typically a manual switch, can isolate entire power storage system 1 from both power system 2 and load 3.

Controller 123 is implemented by cooperation of hardware and software resources. The hardware resource may be a microcomputer, a digital signal processor (DSP), a field programmable gate array (FPGA), another large scale integration (LSI), or an analog element. The software resource may be a program such as firmware. Controller 123 receives the management data on power storage unit 111 from management unit 112 via communication line 15a. Controller 123 is connected to system controller 30 via communication line 40. Communication may be conducted between controller 123 and system controller 30 with a communication scheme conforming to specifications of RS-485, Ethernet (registered trademark), or a controller area network (CAN), for example. When receiving the management data from management unit 112, controller 123 stores this management data, as log data indicating a usage status of power storage unit 111, and transmits the log data to system controller 30 via communication line 40.

During maintenance and inspection, controller 123 can charge and discharge power storage unit 111, thereby checking charging and discharging operations. In addition, at low temperature (for example, lower than 0° C.), controller 123 can operate DC/AC converter 122 to warm up power storage unit 111 to a predetermined temperature (for example, 0° C.) or higher. Lithium ion batteries are likely to degrade when charged at a low temperature. More specifically, lithium ions released from the positive electrode are less likely to be absorbed in the negative electrode, so that lithium metal is likely to be deposited. Utilizing heat generated by a switching element in DC/AC converter 122 can warm up power storage unit 111 to a temperature at which a charging load sufficiently decreases, in which case no heater is necessary.

When it is necessary to cool down both power storage module 11 and power conditioner 12, a fan (not illustrated) in the cabinet is used. As an alternative example, a room in which power storage system 1 is installed may be hermetically closed, and an air conditioner may be installed inside the room. This configuration can cool down entire power storage system 1. As another alternative example, both power storage module 11 and power conditioner 12 may be cooled down by a cooling device using a coolant.

Similar to power storage block 10a described above, each of other power storage blocks 10b to 10i also typically has the same configuration as power storage block 10a. Each of controllers 123 in the plurality of power conditioners 12a to 12i is connected to system controller 30 via bus type communication line 40. In many cases, a plurality of power conditioners are interconnected via a daisy-chain type communication line. However, if the daisy-chain type communication line is used, when one of the power conditioners is detached from power storage system 1, it may be difficult for entire power storage system 1 to continue to conduct communication. In contrast, if bus type communication line 40 is used, even when one of the power conditioners 12 is detached from power storage system 1, controllers 123 in remaining power conditioner 12 can continue to communicate with system controller 30. Thus, remaining power conditioners 12 successfully continue to perform a normal operation even during the above hot-swap.

For the plurality of power storage units 111 interconnected in parallel, either the same type or different types of storage batteries may be used. For example, power storage units 111 with high-power batteries and with high-capacity batteries may be used together. Management units 112 for power storage units 111 report characteristic parameters of storage batteries contained in power storage units 111 to system controller 30 via controllers 123. Those characteristic parameters include at least rated voltages, rated currents, and temperature characteristics of power storage units 111. In addition, controllers 123 reports at least rated voltages, rated currents, and temperature characteristics of DC/DC converters 121 and DC/AC converters 122 to system controller 30, as characteristic parameters of power conditioner 12.

System controller 30 individually controls the plurality of power storage blocks 10a to 10i, thereby managing entire energy of power storage system 1. Further, system controller 30 can individually control the start and stop of the operations of the plurality of power storage blocks 10a to 10i. In addition, system controller 30 can individually control amounts of charge or discharge power of the plurality of power storage blocks 10a to 10i. In this case, system controller 30 determines the amount of charge or discharge power so as to fall within the ranges of the rated voltages and currents of power storage unit 111 and power conditioner 12 in each power storage block 10.

System controller 30 weights the amounts of charge or discharge power for U-phase power storage units 111, based on temperatures of U-phase power storage units 111 acquired from controllers 123 in the plurality of U-phase power conditioners 12, in such a way that variations in the SOCs of U-phase power storage units 111 are averaged. Internal resistances of lithium ion batteries tend to increase as the temperatures decrease. Thus, when lithium-ion batteries are charged with the same amount of charging currents, the SOCs of the lithium-ion batteries having lower temperatures increase at lower rates. When lithium-ion batteries discharge the same amount of discharging currents, the SOCs of the lithium-ion batteries having lower temperatures decrease at higher rates. System controller 30 transmits, to U-phase controllers 123 via communication line 40, current or power instruction values related to the weighted amounts of charge or discharge power for U-phase power storage units 111. The above control is also performed for each of the V and W phases.

Based on the current instruction values received from system controller 30, controllers 123 determine duty ratios for switching elements (not illustrated) in DC/DC converters 121, and then drive DC/DC converters 121 at the determined duty ratios. If DC/DC converters 121 are not used, controllers 123 may control duty ratios for switching elements (not illustrated) in DC/AC converters 122.

System controller 30 weights the amounts of charge or discharge power for U-phase power storage units 111, based on the SOHs of U-phase power storage units 111 acquired from controllers 123 in the plurality of U-phase power conditioners 12, in such a way that the SOHs of U-phase power storage units 111 are averaged. In this case, system controller 30 may set the amount of charge or discharge power for U-phase power storage unit 111 having a low SOH to zero (namely, a stop state). System controller 30 transmits, to U-phase controllers 123 via communication line 40, current instruction values related to the weighted amounts of charge or discharge power for U-phase power storage units 111. The above control is also performed for each of the V and W phases. Optionally, for each phase, system controller 30 may weight the amounts of charge or discharge power for power storage units 111, in consideration of variations in the temperatures and SOHs of the plurality of power storage units 111.

If the total amount of charge or discharge power for power storage system 1 is small, the plurality of power conditioners 12 are prone to operate ineffectively for each phase. If the amounts of charge or discharge power converted by power conditioners 12 are small, a ratio of consumed power required to drive both DC/DC converters 121 and DC/AC converters 122 to the charge or discharge power may increase. For this reason, when the total amount of charge or discharge power for power storage system 1 is small, a number of power conditioners 12 that operate for each phase is limited.

In accordance with the total amount of charge or discharge power for power storage system 1, system controller 30 determines the number of power conditioners 12 to be forced to operate per phase. For example, if the total amount of charge or discharge power for power storage system 1 is equal to or less than a lowest threshold, system controller 30 may determine that the number of power conditioners 12 to be forced to operate per phase is one. In this case, per phase, system controller 30 causes power conditioner 12 for power storage unit 111 having a high SOH and/or a low temperature to operate preferentially. For example, system controller 30 may cause power conditioner 12 having the highest SOH to operate.

If different types of storage batteries are used in the plurality of power storage units 111 interconnected in parallel, system controller 30 selectively uses power storage units 111 in accordance with the total amount of charge or discharge power. For example, if the total amount of charge or discharge power is small, system controller 30 may preferentially use power storage unit 111 having a high-capacity storage battery. If the total amount of charge or discharge power in power storage system 1 is large, system controller 30 may preferentially use power storage unit 111 having a high-power storage battery.

Upon system interconnection, power storage system 1 can employ a peak shift. The peak shift is performed to keep a balance between supply and demand in power system 2 by charging power storage system 1 in night time during which demand for the power decreases and, in turn, by discharging power storage system 1 in a peak time zone within a day time during which the demand for the power increases. Many electric power companies set electric rates for night time to be lower than electric rates for day time. Thus, it is possible to save electric rates by charging power storage system 1 with power in the night time and discharging power storage system 1 in the peak time zone.

System controller 30 transmits charge instructions to controllers 123 in the plurality of power conditioners 12a to 12i in a preset charge time zone. In this case, system controller 30 sequentially transmits the charge instructions to controllers 123 in the plurality of power conditioners 12a to 12i, in consideration of the SOC and SOH of each power storage unit 111, so that the power does not exceed a preset peak power value for power system 2.

System controller 30 transmits discharge instructions to controllers 123 in the plurality of power conditioners 12a to 12i during a preset discharge time zone. The discharge time zone and the amount of discharge power may be manually set by a user or based on a value acquired, via a network, from a load forecast system constructed in an external server or personal computer.

During the discharging according to the peak shift, power storage system 1 needs to operate so as not to lose a balance in discharge power between the U, V, and W phases. When power storage module 11 or power conditioner 12 in power storage block 10 for a certain phase is repaired or replaced during the discharging, breaker 13 in this power storage block 10 is switched off. Then, system controller 30 halts operations of respective ones of power conditioners 12 in the power storage blocks 10 for the other two phases. Alternatively, system controller 30 may perform control so as to compensate for the power discharged from power storage block 10 to be halted by increasing the power discharged from other power storage blocks 10 in this phase partially halted, or so as to keep the balance in power between the three phases by decreasing the discharge power discharged from power storage blocks 10 for the other two phases. In this way, it is possible to suppress the imbalance in discharge power between the U, V, and W phases.

When old power conditioner 12 is replaced by a new one, a log of the management data on power storage unit 111 is copied from old power conditioner 12 to new power conditioner 12. When old power storage module 11 is replaced by new power storage module 11 having different types of batteries, controller 123 in power conditioner 12 reads the characteristic parameters from new power storage module 11 after new power storage module 11 has connected to power conditioner 12. Then, controller 123 reports the read characteristic parameters to system controller 30 via communication line 40.

System controller 30 is connectable to the Internet via Ethernet (registered trademark), for example. Furthermore, system controller 30 can acquire a power value used in load 3 from a power meter (not illustrated) disposed between power system 2 and a cabinet panel connected to power storage system 1.

System controller 30 periodically transmits information on the power value used in load 3 and information on the charge or discharge of power conditioners 12a to 12i to the load forecast system via the Internet. Based on the information on the power value used in load 3, history information regarding the information on the charge or discharge of power conditioners 12a to 12i, and information on a weather forecast for tomorrow, the load forecast system predicts a variation in load 3 for tomorrow. Then, the load forecast system transmits forecast information such as the variation in load 3 to system controller 30 via the Internet.

System controller 30 is connectable, via the Internet, to a remote monitoring system constructed in an external server. This remote monitoring system is operated by a maintenance and management section that maintains and manages power storage system 1 or an independent management and management company. The remote monitoring system acquires information regarding power storage system 1 from system controller 30 and stores this information. An operator of the remote monitoring system can view a state of power storage system 1. The user of power storage system 1 can access the remote monitoring system by using an information terminal device, such as a personal computer or smartphone, and can view the state of power storage system 1.

System controller 30 is also connectable, via the Internet or a dedicated line, to a remote control system constructed in a server possessed by a system operation organization, such as an electric power company. This remote control system transmits various instructions to system controller 30 in order to stabilize the voltage of power system 2. For example, when the voltage of power system 2 exceeds a preset upper value, the remote control system transmits an instruction to system controller 30 to reduce the output. When the voltage of power system 2 drops below a preset lower value, the remote control system transmits an instruction to system controller 30 to cancel the reduction in the output.

When the voltage of power system 2 exceeds the preset upper value, the remote control system may directly instruct system controller 30 to charge power storage system 1 with power from power system 2. When the voltage of power system 2 drops below the preset lower value, the remote control system may directly instruct system controller 30 to discharge power from power storage system 1 to power system 2. Power storage system 1 connected to the remote control system can form a part of a virtual power plant (VPP).

Power storage system 1 can be used as a backup system when power system 2 fails to supply the power. When power system 2 fails to supply the power, power storage system 1 switches from a system interconnection operation to an autonomous operation. Since no system voltage is used during the autonomous operation, the plurality of power conditioners 12a to 12i need to synchronize phases together. During the autonomous operation, system controller 30 broadcasts a synchronization signal (for example, pulse signal) to controllers 123 in the plurality of power conditioners 12a to 12i via communication line 40. Based on the received synchronization signal, each controller 123 determines when to output a single-phase AC voltage.

During the autonomous operation, each of the plurality of power conditioners 12a to 12i performs a basic operation. Further, system controller 30 controls distribution of discharge power, based on states of power storage modules 11a to 11i and power conditioners 12a to 12i. Then, the plurality of power conditioners 12a to 12i output ACs to three-phase AC wire 20 such that the total amount of the ACs for each phase becomes equal to the amount of a current acquired by evenly dividing a current consumed by load 3. In addition, during the autonomous operation, system controller 30 may halt the operations of some of power conditioners 12 in consideration of the power consumed by load 3 and maximum output power of power storage system 1. Then, system controller 30 may sequentially halt the operations of power conditioners 12 one after another at predetermined time intervals such that power storage system 1 can output the maximum power over the longest period.

Power storage system 1 is assembled at an installation site as a general rule. A number of power storage blocks 10 to be connected can be adjusted flexibly and is determined in accordance with user's needs. If power storage system 1 is of a small-scale type, a small number of power storage blocks 10 are connected. If power storage system 1 is of a large-scale type, a large number of power storage blocks 10 are connected. The operator may refer to specifications and insert a designated number of power storage blocks 10 into slots in the cabinet at the site. In addition, the operator may connect two output terminals of each power storage block 10 to designated phases of three-phase AC wire 20. Then, the operator mounts system controller 30 on the plurality of power storage blocks 10a to 10i stacked, and connects system controller 30 to the plurality of power conditioners 12a to 12i via communication line 40. After having completely set hardware, the operator sets up the system. An important process of setting up the system is a process of causing each power conditioner 12 to recognize its own phase.

Figure 4:
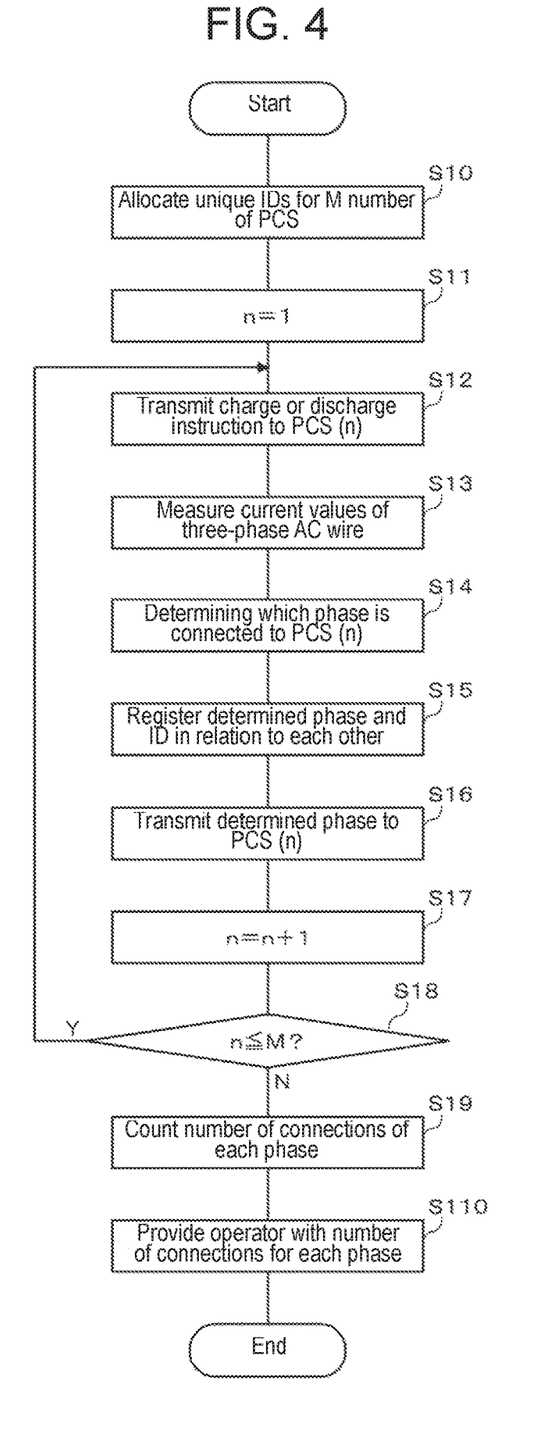
FIG. 4 is an explanatory flowchart of a phase determination sequence to be executed when the power storage system according to the exemplary embodiment of the present invention is installed.

FIG. 4 is an explanatory flowchart of a phase determination sequence to be executed when power storage system 1 according to the exemplary embodiment of the present invention is installed. As preconditions, all of master breaker 51, the plurality of breakers 13, and electromagnetic relay 52 are in an ON state. All of system controller 30 and the plurality of controllers 123 are in an active state. An M (M being an integer of six or more) number of power storage blocks 10 are connected to system controller 30.

System controller 30 uniquely allocates identifications (IDs) for the M number of power conditioners 12 connected to three-phase AC wire 20 to controllers 123 in the M number of power conditioners 12 via communication line 40 (S10). System controller 30 sets a parameter n to an initial value (one in this flowchart) (S11). System controller 30 transmits a charge or discharge instruction to controller 123 in n-th power conditioner 12 (S12). In accordance with the received charge or discharge instruction, controller 123 in n-th power conditioner 12 charges or discharges power storage unit 111.

System controller 30 measures current values flowing through respective phases of three-phase AC wire 20, based on an output value of current and voltage sensor 53 (S13). System controller 30 identifies the phase through which the current flows, thereby determining which phase is connected to n-th power conditioner 12 (S14). System controller 30 registers the determined phase and the ID of n-th power conditioner 12 in relation to each other (S15), and then transmits the determined phase to n-th power conditioner 12 (S16). System controller 30 increments the parameter n (S17).

System controller 30 compares the parameter n and the number of connections M (S18). When the parameter n is equal to or less than the number of connections M (Y at S18), system controller 30 moves the process to Step S12, and repeats the processes at Steps S12 to S17. When the parameter n exceeds the number of connections M (N at S18), system controller 30 counts the number of connections of each phase (each of U, V, and W phases) (S19). System controller 30 provides the operator with the number of connections for each phase (S110). As an example, if a display unit is disposed outside the cabinet of power storage system 1, system controller 30 may display the number of connections for each phase in the display unit. As an alternative example, system controller 30 may transmit the number of connections for each phase to the remote monitoring system on the Internet. In this case, the operator may access the remote monitoring system by using the information terminal device, thereby recognizing how many connections are used for each phase.

The operator checks the number of connections for each phase which has been counted by system controller 30 and the number of connections for each phase described in the specifications. If both the numbers are not equal to each other, the operator checks the connections of wires of the M number of power conditioners 12 and corrects the connections as appropriate.

The operator may enter the phases connected to power conditioners 12 in system controller 30 in advance. In this case, system controller 30 may sequentially cause conditioners 12 to charge or discharge power storage modules 11 one after another. If the phases entered by the operator differ from the phases detected by current and voltage sensor 53, system controller 30 may output an alarm.

As an example, if an operation unit is disposed outside the cabinet of power storage system 1, the operator may enter the phases to which power conditioners 12 are connected, in system controller 30 through the operation unit. As an alternative example, the operator may enter the phases connected to power conditioners 12 from the information terminal device possessed by the operator via the remote monitoring system. When hearing the alarm, the operator may check the connections of wires of the M number of power conditioners 12 and correct the connections as appropriate.

Power storage system 1, if being of a delta connection system, can self-diagnose an interior of the system without using an external device. The self-diagnosis can be performed by referring to voltages between the phases. Hereinafter, a description will be given of an example of a configuration of a circuit that detects the voltages between the phases.

Figure 5:
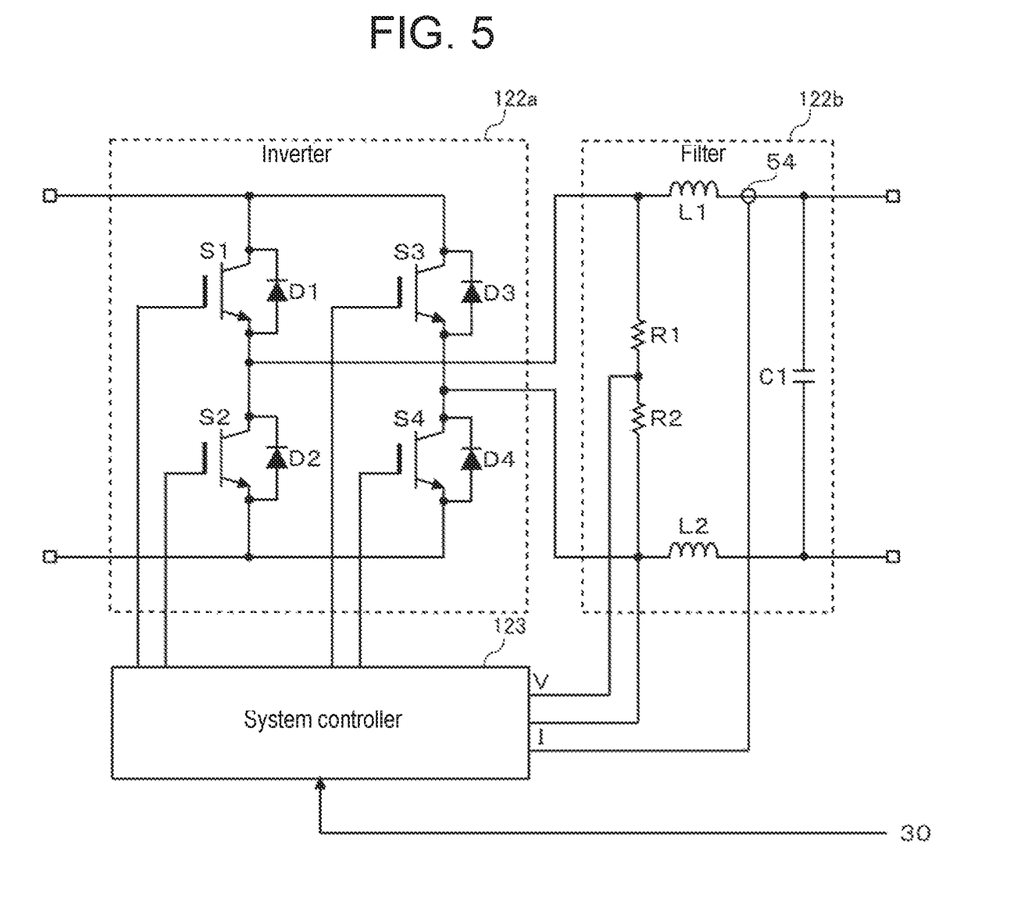
FIG. 5 is a view of an example of a configuration of a DC/AC converter in FIG. 3.

FIG. 5 is a view of an example of a configuration of DC/AC converter 122 in FIG. 3. DC/AC converter 122 includes inverter 122a and filter 122b. Inverter 122a is formed of a full-bridge circuit. This full-bridge circuit includes: a first arm in which first switching element S1 is connected in series to second switching element S2; and a second arm in which third switching element S3 is connected in series to fourth switching element S4. The first arm is connected in parallel to the second arm. AC power is output from midpoints of the first arm and the second arm. It should be noted that bias circuits for first switching element S1, second switching element S2, third switching element S3, and fourth switching element S4 are not illustrated.

Each of first switching element S1 to fourth switching element S4 may be an insulated gate bipolar transistor (IGBT), for example. First back-flow diode D1 to fourth back-flow diode D4 are connected in parallel to first switching element S1 to fourth switching element S4, respectively, in a reverse direction. Each of first switching element S1 to fourth switching element S4 may also be a metal oxide semiconductor field effect transistor (MOSFET). In this case, each of first back-flow diode D1 to fourth back-flow diode D4 may be a parasitic diode formed in a direction from a source to a drain of the MOSFET.

Filter 122*b* includes first reactor L1, second reactor L2, and capacitor C1. Filter 122*b* attenuates harmonic components of AC power output from inverter 122*a* and makes each of an output voltage and current become closer in shape to a sinusoidal wave. Two output terminals of filter 122*b* are connected to two lines of three-phase AC wire 20 via breaker 13. The description has been given based on the flow of the discharge direction. However, inverter 122*a* and filter 122*b* can also charge power storage module 11.

Filter 122*b* includes a voltage-dividing circuit at an upstream stage of both first reactor L1 and second reactor L2. The voltage-dividing circuit is a circuit in which first resistor R1 is connected in series to second resistor R2. A midpoint between first resistor R1 and second resistor R2 is connected to a voltage value input port of controller 123. Filter 122*b* includes current sensor 54. An output terminal of current sensor 54 is connected to a current value input port of controller 123.

Figure 6:
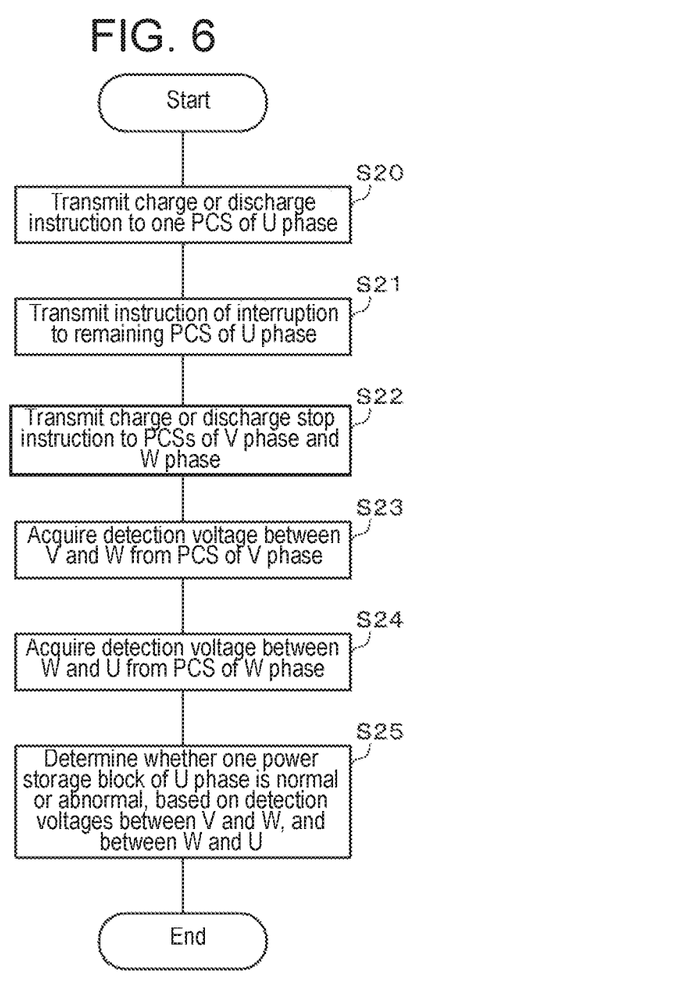
FIG. 6 is an explanatory flowchart of a self-diagnostic process to be performed by the power storage system according to the exemplary embodiment of the present invention.

FIG. 6 is an explanatory flowchart of a self-diagnostic process to be performed by power storage system 1 according to the exemplary embodiment of the present invention. System controller 30 selects one of the plurality of power storage blocks 10 for the U phase which are connected between U-phase wire 20U and V-phase wire 20V, and transmits a charge or discharge instruction to controller 123 in power conditioner 12 in the selected power storage block 10 for the U phase (S20). As a result, via selected power storage block 10 for the U phase, conduction is established between U-phase wire 20U and V-phase wire 20V. System controller 30 transmits an instruction to controllers 123 in power conditioners 12 within the remaining ones of the plurality of power storage blocks 10 for the U phase to interrupt conduction between U-phase wire 20U and V-phase wire 20V (S21).

System controller 30 transmits a charge or discharge stop instruction to controllers 123 in power conditioners 12 within the plurality of power storage blocks 10 for the V phase which are connected between V-phase wire 20V and W-phase wire 20W. Likewise, system controller 30 transmits the charge or discharge stop instruction to controllers 123 in power conditioners 12 within the plurality of power storage blocks 10 for the W phase which are connected between W-phase wire 20W and U-phase wire 20U (S22).

System controller 30 acquires a detection voltage between V-phase wire 20V and W-phase wire 20W from at least one of controllers 123 in power conditioners 12 within the plurality of power storage blocks 10 for the V phase (S23). Further, controller 123 detects a voltage between V-phase wire 20V and W-phase wire 20W, based on a voltage stepped down by the voltage-dividing circuit in filter 122*b*. System controller 30 acquires a detection voltage between W-phase wire 20W and U-phase wire 20U from at least one of controllers 123 in power conditioners 12 within the plurality of power storage blocks 10 for the W phase (S24). Further, controller 123 detects a voltage between W-phase wire 20W and U-phase wire 20U, based on a voltage stepped down by the voltage-dividing circuit in filter 122*b*.

Based on the detection voltages between V-phase wire 20V and W-phase wire 20W and between W-phase wire 20W and U-phase wire 20U, system controller 30 determines whether above one power storage block 10 for the U phase is normal (S25). More specifically, system controller 30 determines whether a voltage value acquired by adding the detection voltage between W-phase wire 20W and U-phase wire 20U to the detection voltage between V-phase wire 20V and W-phase wire 20W is substantially equal to a voltage value output from one power storage block 10 for the U phase. When both the voltage values are substantially equal to each other, system controller 30 determines that above one power storage block 10 for the U phase is normal. However, when both the voltage values are not substantially equal to each other, system controller 30 determines that above one power storage block 10 for the U phase is abnormal. This diagnostic method also makes it possible to detect a disconnection between three-phase AC wire 20 and DC/AC converter 122 in above one power storage block 10 for the U phase.

The above self-diagnostic process is sequentially applied to other power storage blocks 10 for the U phase. Then, the self-diagnostic process that has been applied to the U phase is also applied to the V and W phases.

Hereinafter, a description will be given of a flow of the self-diagnostic process to be applied to power storage block 10 for the V phase. System controller 30 selects one of the plurality of power storage blocks 10 for the V phase which are connected between V-phase wire 20V and W-phase wire 20W, and transmits a charge or discharge instruction to controller 123 in power conditioner 12 in selected power storage block 10 for the V phase. System controller 30 transmits an instruction to controllers 123 in power conditioners 12 within the remaining ones of the plurality of power storage blocks 10 for the V phase to interrupt conduction between V-phase wire 20V and W-phase wire 20W. System controller 30 transmits the charge or discharge stop instruction to controllers 123 in power conditioners 12 within the plurality of power storage blocks 10 for the W phase which are connected between W-phase wire 20W and U-phase wire 20U. System controller 30 transmits the charge or discharge stop instruction to controllers 123 in power conditioners 12 within the plurality of power storage blocks 10 for the U phase which are connected between U-phase wire 20U and V-phase wire 20V.

System controller 30 acquires a detection voltage between W-phase wire 20W and U-phase wire 20U from at least one of controllers 123 in power conditioners 12 within the plurality of power storage blocks 10 for the W phase. System controller 30 acquires a detection voltage between U-phase wire 20U and V-phase wire 20V from at least one of controllers 123 in power conditioners 12 within the plurality of power storage blocks 10 for the U phase.

Based on the detection voltages between W-phase wire 20W and U-phase wire 20U and between U-phase wire 20U and V-phase wire 20V, system controller 30 determines whether above one power storage block 10 for the V phase is normal. More specifically, system controller 30 determines whether a voltage value acquired by adding the detection voltage between W-phase wire 20W and U-phase wire 20U to the detection voltage between U-phase wire 20U and V-phase wire 20V is substantially equal to a voltage value output from one power storage block 10 for the V phase. When both the voltage values are substantially equal to each other, system controller 30 determines that above one power storage block 10 for the V phase is normal. However, when both the voltage values are not substantially equal to each other, system controller 30 determines that above one power storage block 10 for the V phase is abnormal. The above self-diagnostic process is sequentially applied to other power storage blocks 10 for the V phase.

Hereinafter, a description will be given of a flow of the self-diagnostic process to be performed on power storage block 10 for the W phase. System controller 30 selects one of the plurality of power storage blocks 10 for the W phase which are connected between W-phase wire 20W and U-phase wire 20U, and transmits a charge or discharge instruction to controller 123 in power conditioner 12 in selected power storage block 10 for the W phase. System controller 30 transmits an instruction to controllers 123 in power conditioners 12 within the remaining ones of the plurality of power storage blocks 10 for the W phase to interrupt conduction between W-phase wire 20W and U-phase wire 20U. System controller 30 transmits a charge or discharge stop instruction to controllers 123 in power conditioners 12 within the plurality of power storage blocks 10 for the U phase which are connected between U-phase wire 20U and V-phase wire 20V. System controller 30 transmits a charge or discharge stop instruction to controllers 123 in power conditioners 12 within the plurality of power storage blocks 10 for the V phase which are connected between V-phase wire 20V and W-phase wire 20W.

System controller 30 acquires a detection voltage between U-phase wire 20U and V-phase wire 20V from at least one of controllers 123 in power conditioners 12 within the plurality of power storage blocks 10 for the U phase. System controller 30 acquires a detection voltage between V-phase wire 20V and W-phase wire 20W from at least one of controllers 123 in power conditioners 12 within the plurality of power storage blocks 10 for the V phase.

Based on the detection voltages between U-phase wire 20U and V-phase wire 20V and between V-phase wire 20V and W-phase wire 20W, system controller 30 determines whether above one power storage block 10 for the W phase is normal. More specifically, system controller 30 determines whether a voltage value acquired by adding the detection voltage between U-phase wire 20U and V-phase wire 20V to the detection voltage between V-phase wire 20V and W-phase wire 20W is substantially equal to a voltage value output from one power storage block 10 for the W phase. When both the voltage values are substantially equal to each other, system controller 30 determines that above one power storage block 10 for the W phase is normal. However, when both the voltage values are not substantially equal to each other, system controller 30 determines that above one power storage block 10 for the W phase is abnormal. The above self-diagnostic process is sequentially applied to the other power storage blocks 10 for the W phase.

By using the charge or discharge instruction, system controller 30 may transmit instruction values of charge and discharge to power conditioners 12 for the same phase.

Then, system controller 30 may supply or receive power inside the system, thereby checking a normal operation of the device.

Hereinafter, a description will be given of an operational power supply to each power conditioner 12 and system controller 30. Upon system interconnection, a power supply generated based on power of power system 2 is typically used as the operational power supply to each power conditioner 12 and system controller 30. However, if power system 2 fails to supply the power, each power conditioner 12 and system controller 30 need to use the power of power storage modules 11, because the power of power system 2 cannot be used. When power system 2 fails to supply the power, it is necessary to temporarily disconnect power conditioners from power system 2 in accordance with voltage ride through (VRT) specified by system interconnection requirements in a nation.

Figure 7:
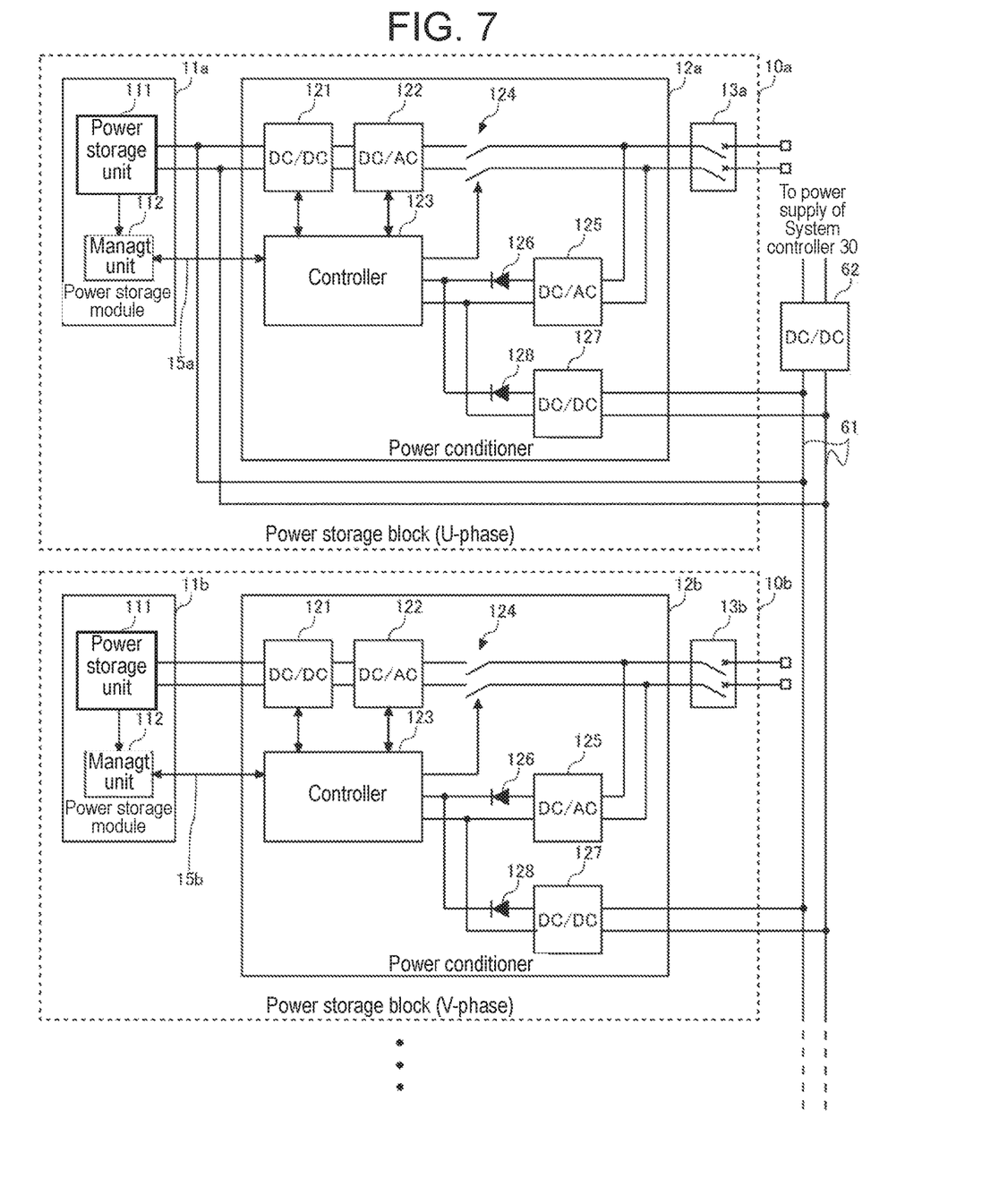
FIG. 7 is a view of the circuit configuration of the power storage system illustrated in FIG. 2 or 3, plus a configuration regarding an operational power supply route.

FIG. 7 is a view of the circuit configuration of power storage system 1 illustrated in FIG. 2 or 3, plus a configuration regarding an operational power supply route. One of the plurality of power storage blocks 10*a* to 10*i* is set to an uninterruptible power supply (UPS). In FIG. 7, power storage block 10*a* is set to the UPS. Control power lines 61 branch off from respective DC wires between power storage unit 111 and DC/DC converter 121 in power storage block 10*a*, which has been set to the UPS. Control power lines 61 are used to supply operational power supply upon power failure.

Each power conditioner 12 includes, in addition to DC/DC converter 121, DC/AC converter 122, and controller 123, relay 124, AC/DC converter 125, and DC/DC converter 127. Relay 124 is interposed between DC/AC converter 122 and breaker 13. When power system 2 fails to supply the power, controller 123 turns off relay 124 to disconnect power conditioner 12 from power system 2. If DC/DC converter 121 or DC/AC converter 122, which is a main circuit, is of an insulation type, each of AC/DC converter 125 and DC/DC converter 127 may be of an insulation type according to the insulation of DC/DC converter 121 or DC/AC converter 122.

AC wires for the operational power supply branch off from respective AC wires between relay 124 and breaker 13. AC/DC converter 125 converts AC power supplied from the AC wires for the operational power supply into DC power having a predetermined voltage (for example, in a range from 20 V to 24 V). Then, AC/DC converter 125 supplies, as a control power supply, the converted DC power to controller 123 via rectifier diode 126. Controller 123 steps down the received control power supply with a regulator (not illustrated) and uses this control power supply as the operational power supply. This control power supply is also used as an operational power supply for DC/DC converter 121 and DC/AC converter 122 although this supply route is not illustrated.

DC/DC converter 127 converts DC power supplied from control power lines 61 into DC power having a predetermined voltage (for example, in a range from 20 V to 24 V). Then, DC/DC converter 127 merges, as a control power supply, the converted DC power to an output line of DC/AC converter 122 via rectifier diode 128. Providing DC/DC converter 127, even if it is impossible to acquire the control power supply from AC/DC converter 125 due to power failure of power system 2, can reserve the control power supply inside each power conditioner 12. It should be noted that controller 123 keeps halting the operation of DC/DC converter 127 during a normal operation.

Control power lines 61 are further connected to DC/DC converter 62 that supplies the control power supply to system controller 30. DC/DC converter 62 converts the DC power supplied from control power line 61 into DC power having a predetermined voltage (for example, in a range from 20 V to 24 V). Then, DC/DC converter 62 supplies the converted DC power to system controller 30 as the control power supply. System controller 30 steps down the received control power supply with a regulator (not illustrated) and uses this control power supply as the operational power supply. It should be noted that the control power supply is also supplied to a drive coil in electromagnetic relay 52, for example, although a supply route of the control power supply is not illustrated.

According to this exemplary embodiment, as described above, each power storage block 10 includes a combination of small-capacity power storage module 11 and low-output power conditioner 12, and it is possible to flexibly tune an output and capacity of power storage system 1 by adjusting the number of power storage blocks 10 to be used. In short, it is possible to finely and efficiently tune an entire capacity of power storage system 1. Power storage blocks 10 can be easily added to power storage system 1, so that it is possible to flexibly change the capacity of power storage system 1 in accordance with user's needs.

Even if one of power storage modules 11 degrades, less significant influence is exerted on entire power storage system 1 than any power storage system in which many power storage modules 11 are interconnected in series.

Since three-phase AC wire 20 can be formed of either a delta or star connection, power storage system 1 can support various types of power systems 2. If three-phase AC wire 20 is formed of a delta connection system, power storage system 1 can self-diagnose a system operation inside the system by using potential differences between phases. In which case, no external device is necessary.

Providing breaker 13 for each power storage block 10 can make disconnection and switch between charge and discharge operations in units of power storage blocks 10. Therefore, even if some of power storage modules 11 and power conditioners 12 fail to operate properly, power storage system 1 can easily operate in a degraded manner, because power storage modules 11 and power conditioners 12 are hot-swappable.

Providing system controller 30 can control a three-phase AC output so as not to become imbalanced. For example, even if any of power storage blocks 10 fails to operate properly, system controller 30 operates or halts some other power storage blocks 10 or controls the amounts of charge or discharge power for other power storage blocks 10, thereby successfully continuing to operate the system with the imbalance of the three-phase AC output suppressed.

The present invention has been described with reference to the exemplary embodiment. Those skilled in the art will comprehend that the exemplary embodiment is an example, the combinations of the constituent elements and the processing steps can be modified in various ways, but nevertheless such modifications are included in the scope of the present invention.

In the foregoing exemplary embodiment, load 3 is not divided into a general load and a specific load, but may be divided into a general load and a specific load. In this case, a wire for the specific load may branch off from three-phase AC wire 20. During the autonomous operation, system controller 30 may supply the AC power received from power storage system 1 to only the specific load.

The exemplary embodiment may be specified by Items described below.

[Item 1]

Power storage system (1) including:
three-phase alternating current (AC) wire (20) connected to three-phase AC power system (2);
a plurality of power storage blocks (10*a* to 10*i*) connected in parallel to three-phase AC wire (20), each of power storage blocks (10*a* to 10*i*) including power storage module (11) and power conditioner (12); and
system controller (30) that individually controls the plurality of power storage blocks (10*a* to 10*i*),
power storage modules (11) each including
power storage unit (111), and
management unit (112) that manages power storage unit (111), power conditioner (12) including
power converter (121, 122) that converts direct current (DC) power discharged from power storage unit (111) into single-phase AC power and outputs the converted AC power to two lines of three-phase AC wire (20) or that converts single-phase AC power received from the two lines of three-phase AC wire (20) into DC power and charges power storage unit (111), and
controller (123) that controls power converter (121, 122), controller (123) being connected to system controller (30) via first communication line (40), controller (123) being connected to the management unit (112) via second communication line (15),
the plurality of power storage blocks (10*a* to 10*i*) being six or more power storage blocks (10*a* to 10*i*),
out of six or more power storage blocks (10*a* to 10*i*), two or more power storage blocks being U-phase power storage blocks, two or more power storage blocks being V-phase power storage blocks, and two or more power storage blocks being W-phase power storage blocks.

This configuration can construct highly robust, scalable power storage system (1).

[Item 2]

Power storage system (1) according to Item 1, wherein each of power storage blocks (10) further includes
breaker (13) connected between power converter (121, 122) and the two lines of three-phase AC wire (20).

This configuration can electrically disconnect power storage blocks (10) from power storage system (1) in units of power storage blocks (10) during an operation of power storage system (1). Thus, the configuration allows for hot-swap.

[Item 3]

Power storage system (1) according to Item 1 or 2, wherein
system controller (30) is connected to a plurality of controllers (123) via first communication line (40) of a bus type.

This configuration, even if one or more power storage blocks (10) are disconnected from power storage system (1) during an operation of power storage system (1), can continue to conduct communication between system controller (30) and each of remaining power storage blocks (10).

[Item 4]

Power storage system (1) according to any one of Items 1 to 3, wherein
three-phase AC wire (20) includes U-phase wire (20U), V-phase wire (20V), and W-phase wire (20W),
each of U-phase power storage blocks (10) is connected between U-phase wire (20U) and V-phase wire (20V),
each of V-phase power storage blocks (10) is connected between V-phase wire (20V) and W-phase wire (20W), and each of W-phase power storage blocks (10) is connected between W-phase wire (20W) and U-phase wire (20U).

This configuration can support a delta connection.

[Item 5]

Power storage system (1) according to any one of Items 1 to 3, wherein three-phase AC wire (20) includes U-phase wire (20U), V-phase wire (20V), W-phase wire (20W), and N-phase wire (20N), each of U-phase power storage blocks (10) is connected between U-phase wire (20U) and N-phase wire (20N), each of V-phase power storage blocks (10) is connected between V-phase wire (20V) and N-phase wire (20N), and each of W-phase power storage blocks (10) is connected between W-phase wire (20W) and N-phase wire (20N).

This configuration can support a star connection.

[Item 6]

Power storage system (1) according to any one of Items 1 to 5, wherein after three-phase AC wire (20) is connected to the plurality of power storage blocks (10a to 10i) during assembly of power storage system (1), system controller (30)

transmits a charge or discharge instruction to controller (123) in one power storage block (10) out of the plurality of power storage blocks (10a to 10i) via first communication line (40), detects currents flowing through respective wires (20U, 20V, 20W) of three-phase AC wire (20), identifies a phase of one power storage block (10), based on the detected currents, and transmits the identified phase to controller (123) in one power storage block (10) via first communication line (40).

This configuration enables system controller (30) to automatically set a phase of each power conditioner (12).

[Item 7]

Power storage system (1) according to Item 4, wherein system controller (30) instructs controller (123) in one U-phase power storage block (10) out of the plurality of U-phase power storage blocks (10) to conduct between U-phase wire (20U) and V-phase wire (20V), instructs controllers (123) in remaining U-phase power storage blocks (10) to interrupt conduction between U-phase wire (20U) and V-phase wire (20V), instructs controllers (123) in the plurality of V-phase power storage blocks (10) and the plurality of W-phase power storage blocks (10) to stop charging or discharging, acquires a detection voltage between V-phase wire (20V) and W-phase wire (20W) from at least one of controllers (123) in the plurality of V-phase power storage blocks (10), acquires a detection voltage between W-phase wire (20W) and U-phase wire (20U) from at least one of controllers (123) in the plurality of W-phase power storage blocks (10), and determines whether one U-phase power storage block (10) is normal, system controller (30) instructs controller (123) in one V-phase power storage block (10) out of the plurality of V-phase power storage blocks (10) to conduct between V-phase wire (20V) and W-phase wire (20W), instructs controllers (123) in remaining V-phase power storage blocks (10) to interrupt conduction between V-phase wire (20V) and W-phase wire (20W), instructs controllers (123) in the plurality of W-phase power storage blocks (10) and the plurality of U-phase power storage blocks (10) to stop charging or discharging, acquires a detection voltage between W-phase wire (20W) and U-phase wire (20U) from at least one of controllers (123) in the plurality of W-phase power storage blocks (10), acquires a detection voltage between U-phase wire (20U) and V-phase wire (20V) from at least one of controllers (123) in the plurality of U-phase power storage blocks (10), and determines whether one V-phase power storage block (10) is normal, and system controller (30) instructs controller (123) in one W-phase power storage block (10) out of the plurality of W-phase power storage blocks (10) to conduct between W-phase wire (20W) and U-phase wire (20U), instructs controllers (123) in remaining W-phase power storage blocks (10) to interrupt conduction between W-phase wire (20W) and U-phase wire (20U), instructs controllers (123) in the plurality of U-phase power storage blocks (10) and the plurality of V-phase power storage blocks (10) to stop charging or discharging, acquires a detection voltage between U-phase wire (20U) and V-phase wire (20V) from at least one of controllers (123) in the plurality of U-phase power storage blocks (10), acquires a detection voltage between V-phase wire (20V) and W-phase wire (20W) from at least one of controllers (123) in the plurality of V-phase power storage blocks (10), and determines whether one W-phase power storage block (10) is normal.

This configuration can self-diagnose a state of each power storage block (10).

[Item 8]

Power storage system (1) according to any one of Items 1 to 7, further including power supply line (61) for use in supplying operational power supply from power storage module (111) contained in one power storage block (10) out of the plurality of power storage blocks (10) to the plurality of power conditioners (12) and system controller (30).

This configuration can reserve not only an operational power supply to system controller (30) when power system (2) fails to supply power but also a recovery power supply for power conditioners (12).

The invention claimed is:

1. A power storage system comprising:
a three-phase alternating current (AC) wire connected to a three-phase AC power system;
a plurality of power storage blocks connected in parallel to the three-phase AC wire, each of the power storage blocks including a power storage module and a power conditioner; and
a system controller that individually controls the plurality of power storage blocks,
the power storage modules each including
a power storage unit, and
a management unit that manages the power storage unit,
the power conditioner including
a power converter that converts direct current (DC) power discharged from the power storage unit into single-phase AC power and outputs the converted AC power to two lines of the three-phase AC wire or that converts single-phase AC power received from the two lines of the three-phase AC wire into DC power and charges the power storage unit, and
a controller that controls the power converter, the controller being connected to the system controller via a first communication line, the controller being connected to the management unit via a second communication line,
the plurality of power storage blocks being six or more power storage blocks,
out of the six or more power storage blocks connected in parallel to the three-phase AC wire, two or more power storage blocks being U-phase power storage blocks, two or more power storage blocks being V-phase power storage blocks, and two or more power storage blocks being W-phase power storage blocks.

2. The power storage system according to claim 1, wherein
each of the power storage blocks further includes
a breaker connected between the power converter and the two lines of the three-phase AC wire.

3. The power storage system according to claim 1, wherein the system controller is connected to the plurality of controllers via the first communication line of a bus type.

4. The power storage system according to claim 1, wherein
the three-phase AC wire includes a U-phase wire, a V-phase wire, and a W-phase wire,
each of the U-phase power storage blocks is connected between the U-phase wire and the V-phase wire,
each of the V-phase power storage blocks is connected between the V-phase wire and the W-phase wire, and
each of the W-phase power storage blocks is connected between the W-phase wire and the U-phase wire.

5. The power storage system according to claim 4, wherein
the system controller instructs the controller in one U-phase power storage block out of the plurality of U-phase power storage blocks to conduct between the U-phase wire and the V-phase wire, instructs the controllers in remaining U-phase power storage blocks to interrupt conduction between the U-phase wire and the V-phase wire, instructs the controllers in the plurality of V-phase power storage blocks and the plurality of W-phase power storage blocks to stop charging or discharging, acquires a detection voltage between the V-phase wire and the W-phase wire from at least one of the controllers in the plurality of V-phase power storage blocks, acquires a detection voltage between the W-phase wire and the U-phase wire from at least one of the controllers in the plurality of W-phase power storage blocks, and determines whether the one U-phase power storage block is normal,
the system controller instructs the controller in one V-phase power storage block out of the plurality of V-phase power storage blocks to conduct between the V-phase wire and the W-phase wire, instructs the controllers in remaining V-phase power storage blocks to interrupt conduction between the V-phase wire and the W-phase wire, instructs the controllers in the plurality of W-phase power storage blocks and the plurality of U-phase power storage blocks to stop charging or discharging, acquires a detection voltage between the W-phase wire and the U-phase wire from at least one of the controllers in the plurality of W-phase power storage blocks, acquires a detection voltage between the U-phase wire and the V-phase wire from at least one of the controllers in the plurality of U-phase power storage blocks, and determines whether the one V-phase power storage block is normal, and
the system controller instructs the controller in one W-phase power storage block out of the plurality of W-phase power storage blocks to conduct between the W-phase wire and the U-phase wire, instructs the controllers in remaining W-phase power storage blocks to interrupt conduction between the W-phase wire and the U-phase wire, instructs the controllers in the plurality of U-phase power storage blocks and the plurality of V-phase power storage blocks to stop charging or discharging, acquires a detection voltage between the U-phase wire and the V-phase wire from at least one of the controllers in the plurality of U-phase power storage blocks, acquires a detection voltage between the V-phase wire and the W-phase wire from at least one of the controllers in the plurality of V-phase power storage blocks, and determines whether the one W-phase power storage block is normal.

6. The power storage system according to claim 5, further comprising a power supply line for use in supplying operational power supply from a power storage module contained in one power storage block out of the plurality of power storage blocks to the plurality of power conditioners and the system controller.

7. The power storage system according to claim 1, wherein
the three-phase AC wire includes a U-phase wire, a V-phase wire, a W-phase wire, and an N-phase wire,
each of the U-phase power storage blocks is connected between the U-phase wire and the N-phase wire,
each of the V-phase power storage blocks is connected between the V-phase wire and the N-phase wire, and
each of the W-phase power storage blocks is connected between the W-phase wire and the N-phase wire.

8. The power storage system according to claim 1, wherein after the three-phase AC wire is connected to the plurality of power storage blocks during assembly of the power storage system,
the system controller
transmits a charge or discharge instruction to a controller in one power storage block out of the plurality of power storage blocks via the first communication line,
detects currents flowing through respective wires of the three-phase AC wire,
identifies a phase of the one power storage block, based on the detected currents, and
transmits the identified phase to the controller in the one power storage block via the first communication line.

9. The power storage system according to claim 8, further comprising a power supply line for use in supplying operational power supply from a power storage module contained in one power storage block out of the plurality of power storage blocks to the plurality of power conditioners and the system controller.

10. The power storage system according to claim 1, further comprising a power supply line for use in supplying operational power supply from a power storage module contained in one power storage block out of the plurality of power storage blocks to the plurality of power conditioners and the system controller.

11. The power storage system according to claim 10, further comprising a power supply line for use in supplying operational power supply from a power storage module contained in one power storage block out of the plurality of power storage blocks to the plurality of power conditioners and the system controller.

* * * * *